Sept. 15, 1964  L. R. WOODS  3,148,530
ELECTRIC ACTUATED IMPACT TESTING MACHINE
Filed March 23, 1961  2 Sheets-Sheet 1

INVENTOR.
LEROY R. WOODS
BY
Beehler & Shanahan
ATTORNEYS.

Sept. 15, 1964 L. R. WOODS 3,148,530
ELECTRIC ACTUATED IMPACT TESTING MACHINE
Filed March 23, 1961 2 Sheets-Sheet 2
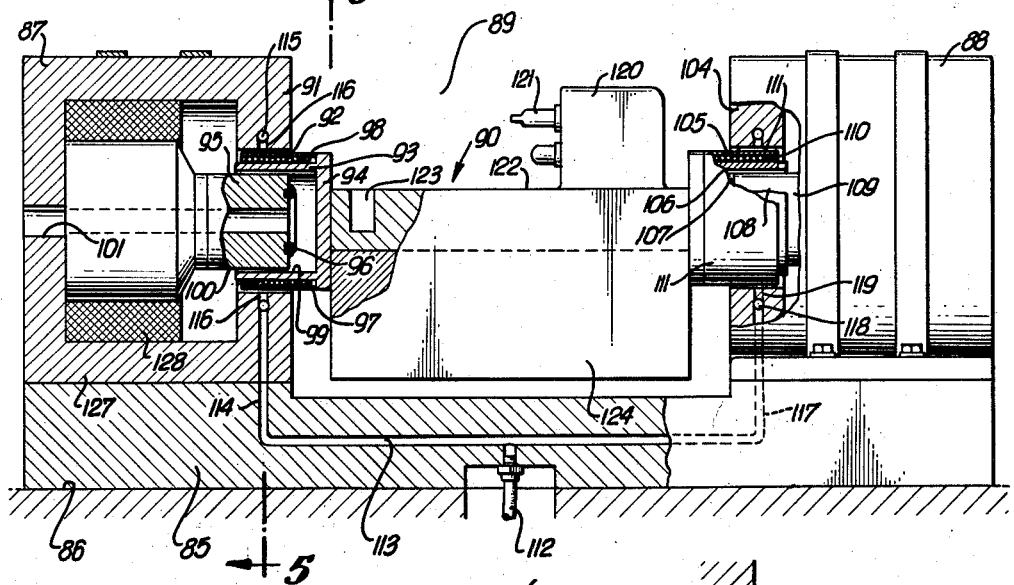
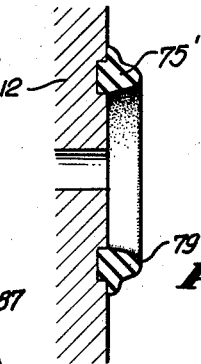
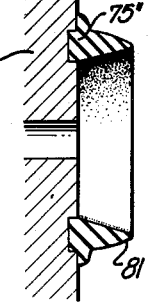
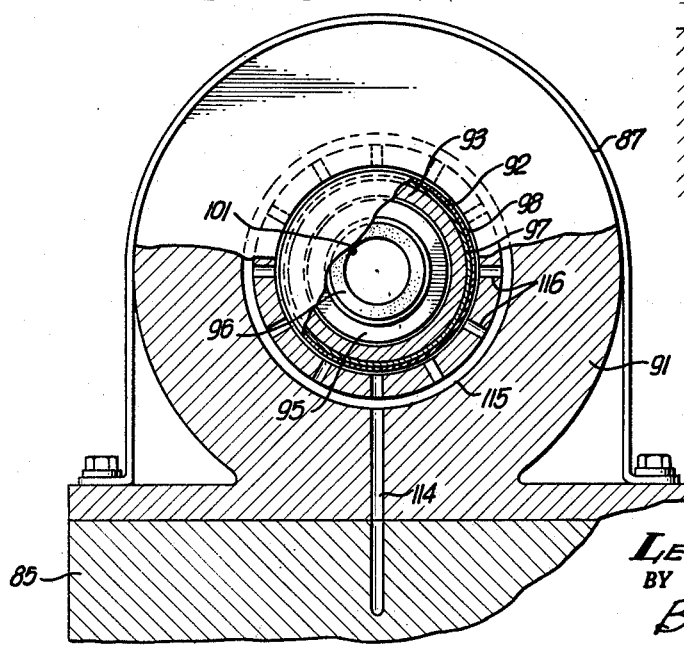
INVENTOR.
LEROY R. WOODS
BY
Beehler & Shanahan
ATTORNEYS.

United States Patent Office 3,148,530
Patented Sept. 15, 1964

3,148,530
ELECTRIC ACTUATED IMPACT TESTING
MACHINE
Leroy R. Woods, Granada Hills, Calif., assignor to International Telephone & Telegraph Corporation, San Fernando, Calif., a corporation of Maryland
Filed Mar. 23, 1961, Ser. No. 97,946
7 Claims. (Cl. 73—12)

The invention relates to testing devices and has special reference to electric actuated testing devices which are capable of subjecting components of various kinds and descriptions to disturbances such as a shock or impact of considerable magnitude of relatively high frequency vibration or perhaps a combination of the two for peak loads and also for periods of time long enough to determine breakdown characteristics.

More particularly the invention relates to an electric actuated device which includes a cradle or carriage upon which components are mounted for testing floated on a film so as to be substantially friction free when the motion is given to it to produce the test conditions. The invention is a continuation-in-part of co-pending application Serial No. 762,086, filed September 19, 1958.

Although some devices have been developed for the purpose of providing vibration tables upon which components can be mounted and there shaken at sundry frequencies for a breakdown test relatively little attention has been directed to providing testing devices for producing shock or impact conditions in order to determine what the effect might be upon comparable components when subjected to a shock or impact of an extremely high degree. Those devices which up to the present time have attempted to provide for shock or impact testing have depended for the most part upon gravity to produce the needed speed and acceleration. Many defects exist in devices heretofore available among which is the inability of so arranging these devices that they can accurately repeat the testing conditions time after time in order to obtain a reasonably close degree of comparison between different performances. Another outstanding defect lies in the fact that even the more rapidly operating devices are capable of creating no more than about one shock or impact per second, the more common devices being actually limited to about one shock or impact test per minute. Moreover, the gravity actuated devices have an extremely limited capacity because of the fact that the acceleration can only reach a certain very limited figure and such devices have the further limitation that they must decelerate in order to produce the desired shock or impact condition.

Besides being very slow in operation and exceedingly tedious from the point of view of testing a variety of components the devices heretofore available are incapable of creating a variety of conditions and more particularly a variety of carefully controlled conditions. Hence, although helpful in testing certain kinds of devices, for the testing of many other types and kinds of devices the machines have been almost useless. Further still, when there is needed a test which is capable of subjecting a component to a combination of both shock and vibration no device has heretofore been available capable of creating such a condition for test purposes.

It is therefore among the objects of the invention to provide a new and improved shock and impact testing machine which is capable of producing precisely desired impact conditions in order that by breaking down a component under those conditions its resistance capabilities can be very carefully delineated.

Another object of the invention is to provide a new and improved testing device for shock and impact conditions which can be very carefully controlled and which can be used in a great variety of test circumstances for both very high impact blows and for relatively moderate impact blows without need for materially varying the type of instrument.

Still another object of the invention is to provide a new and improved testing machine for shock or impact testing of various and sundry components which can produce tests on different axes, which can operate relatively rapidly if need be as well as being capable of delivering but a single impact blow and also one which although electrically actuated, is capable of a substantially long stroke where a long stroke is needed to simulate special conditions.

Still another object of the invention is to provide a new and improved testing machine capable of testing for both impact and vibration on the same machine without alteration of the machine components, the machine being capable of making the varied tests either alternatively or in combination, the versatility moreover being of such a high degree that vibration tests, for example, can be made to follow a varied pattern merely by feeding a different power input to the motor which drives the machine without the necessity for altering the setup or loading or for as much as stopping the machine while changes in the vibration characteristics are being made.

Also included among the objects of the invention is to provide a new and improved machine for shock and vibration testing of such character that the carriage for components to be tested can be floated virtually friction free and mounted in such fashion that no connections need be provided to the vibrating carriage thereby making it possible to have the carriage perform in a dependable fashion uninfluenced by extraneous circumstances which might vary the desired result to an indeterminable degree under certain circumstances.

With these and other objects in view, the invention consists in the construction, arrangement and combination of the various parts of the device whereby the objects contemplated are attained, as hereinafter set forth, pointed out in the appended claims, and illustrated in the accompanying drawings.

In the drawings:

FIGURE 4 is a longitudinal sectional view of another form of the device capable of both impact testing and vibration testing;

FIGURE 5 is a cross-sectional view taken on the line 5—5 of FIGURE 4;

FIGURE 6 is a fragmentary longitudinal sectional view of another form of impact ring usable with the device; and FIGURE 7 is a fragmentary longitudinal sectional view of still a different form of impact ring.

Figure 1:
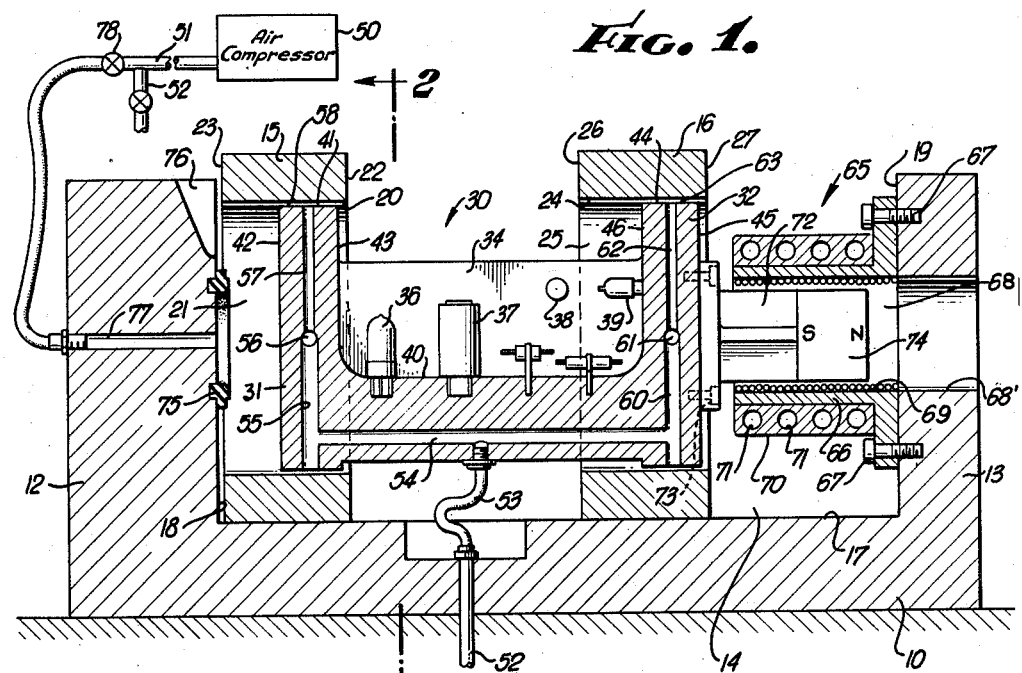
FIGURE 1 is a longitudinal sectional view of one form of the invention with a variety of components mounted thereon for testing.
Figure 2:
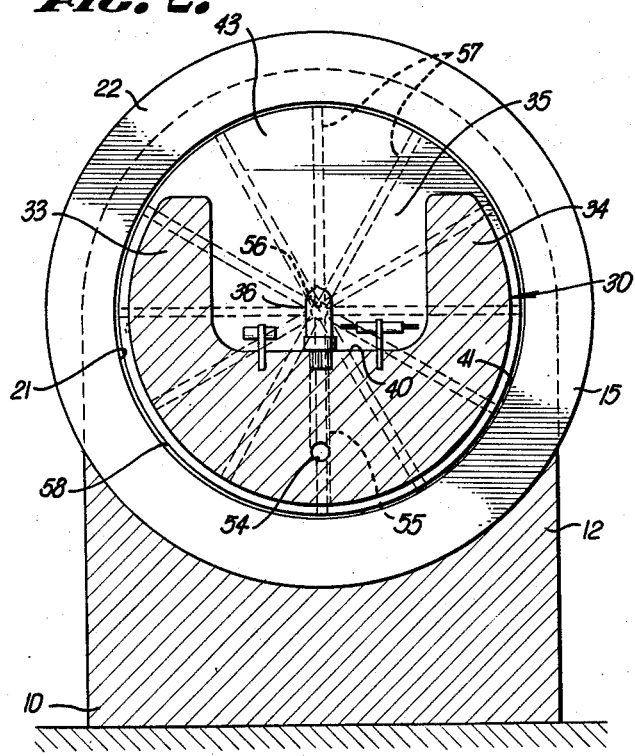
FIGURE 2 is a cross-sectional view taken on the line 2—2 of FIGURE 1.
Figure 3:
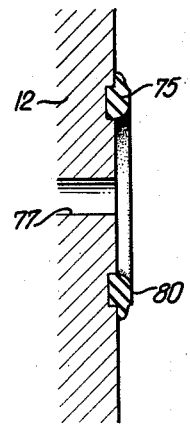
FIGURE 3 is a fragmentary longitudinal sectional view of one form of impact ring usable with the device.

In the form of the invention shown in FIGURES 1 and 2 there is provided a base 10 mounted upon some appropriate supporting surface, the base being provided with upwardly extending end portions 12 and 13 at opposite ends. The end portions define a space 14 therebetween within which is contained a pair of longitudinally spaced bearing mounts 15 and 16, both of which are secured by some appropriate conventional means to an upper surface 17 of the base 10. One of the bearing mounts, namely the mount 15, is positioned adjacent an inner face 18 of the end portion 12 whereas the bearing mount 16 occupies an intermediate portion of the space 14 located an appreciable distance from an inner face 19 of the end portion 13.

Within the bearing mount 15 is an opening 20 which provides a peripherially extending stationary supporting area 21. In the embodiment chosen the supporting area is substantially cylindrical and extends entirely through the breadth of the bearing mount 15 between opposite faces 22 and 23 thereof. In the bearing mount 16 is provided a similar opening 24 in axial alignment with the opening 20 and forming a similar peripherially extending stationary supporting area 25 likewise cylindrical in form and extending between faces 26 and 27 of the bearing mount 16. These two areas 21 and 25 may be defined as a set of longitudinally spaced bearing areas which in effect form a part of the base in that they are fixed and stationary in the machine.

A movable carriage or cradle indicated generally by the reference character 30 has end elements 31 and 32 at opposite ends. Between the end elements are walls 33 and 34 which with the end elements form a recess 35, open at the top, and within which may be mounted sundry components indicated by the reference characters 36, 37, 38, 39, et cetera for testing. As shown, some of the components are mounted upon a bottom 40 of the carriage but may also be mounted upon a vertical or upstanding support such for example as the wall 34 or the end element 32.

The end element 31 is provided with a peripherially extending movable supporting area 41 which is cylindrical in shape and which extends from one face 42 to another face 43 of the end element 31. The movable area 41 as shown is appreciably less than the fixed area 21 within which it is positioned.

Similarly at the opposite end the end element 32 is provided with a peripherially extending movable supporting area 44 which extends between faces 45 and 46 of the end element 32. The movable areas 41 and 44 respectively are concentrically located within the fixed areas 21 and 25 and are very slightly smaller in diameter to leave a very small clearance so that the end elements 31 and 32 can slide freely within the bearing mounts 15 and 16. These clearances although not especially critical are preferably of the category of .001 inch but the precise degree of clearance will vary considerably depending upon whether the machine in question is a very small lightweight machine or a very large heavy machine. Machining tolerances capable of being held will determine to a material degree the amount of clearance which may be employed.

In order to float the carriage 30 within the bearing mounts there is provided a supply of gas under pressure which may be air or other appropriate gas. Where air is depended upon there may be provided an air compressor 50 which sends air under pressure through lines 51 and 52 and where a connection is made to a flexible line 53 by means of which air under pressure is introduced to sundry passageways 54 in the carriage 30. Within the end element 31 is a riser 55 which is fed from the passageway 54 and is the means of conducting air under pressure to an axial compartment 56 which supplies a series of radial passages 57. The radial passages 57 communicate outwardly with a clearance indicated by the reference character 58 which is the clearance previously discussed as existing between the area 21 and the area 41.

Similarly in the end element 32 there is provided a riser 60 fed from the passageway 54 which leads to an axial compartment 61 which in turn feeds radial passages 62. These in turn communicate with a clearance 63 which is the clearance which lies between the area 25 and the area 44.

When air under pressure is conducted to the radial passages 57 and 62 in the manner described the pressure will float the carriage at its end elements upon a film of air which entirely surrounds the end elements so that not only is the carriage lifted clear of the bearing mounts 15 and 16 at the bottom but also remains clear entirely around the periphery. Therefore if there is any eccentric loading or unbalance or if any imbalance is created during operation the air under pressure will continue to act keeping the carriage clear thereby assuring its virtually friction free support as long as the testing is taking place.

To provide the force for creating an impact an electric motor indicated generally by the reference character 65 is supplied. In this form of device the motor consists of one motor element on the end portion 13 and another motor element on the end element 32. The motor element on the end portion 13 consists of a hollow cylindrical sleeve 66 fastened to the end portion 13 by screws 67. The sleeve has an open axial passage 68 extending therethrough which communicates with an aligned passage 68' in the end portion 13. A coil of wire 69 which is insulated electric wire is wound about the interior of the cylindrical sleeve to set up a field. Around the exterior of the cylindrical sleeve is a cooling ring 70 in which are passages 71 through which may be circulated a suitable fluid coolant.

On the end element 32 of the carriage is an extension 72 which may be secured thereto by screws 73. The extension mounts a permanent magnet 74 which is located within the coil 69. By connecting the coil 69 to a suitable source of direct current (not shown) the coil is energized and the field set up by energization of the coil serves to rapidly accelerate the permanent magnet bringing it from a position at rest to a fully accelerated speed and imparting a corresponding accelerated speed to the carriage 30. The carriage may be initially at the end of its stroke farthest toward the right as viewed in FIGURE 1 and then driven from right to left by action of the electric motor. As the carriage travels through a path of movement from right to left as viewed in FIGURE 1 it will move until it strikes an impact ring 75 where the fully accelerating force will be immediately reduced to virtually a standstill but modified by the degree of resiliency which is built into the impact ring 75. For this purpose the end portion 12 may be considered as a stationary impact block for mounting the impact ring and the end element 31 of the carriage may be considered as a movable impact block in that the face 42 thereof strikes the impact ring 75 at the end of its path of movement to produce the desired shock in the carriage 30 which is carried to the components mounted upon it. Because of the rapid motion which would be likely to create an air cushion ahead of the face 42 there is provided a relief passage 76 so that no cushioning effect will be experienced.

After the blow has been delivered the carriage may be returned in a direction from left to right as viewed in FIGURE 1 by employment of an air return passage 77 fed with compressed air from the air compressor 50 passing through a suitable valve or regulator 78. Although air has been suggested as a means of returning the carriage it will be understood that other means may also be employed, and that the means need not exert any substantial amount of pressure in that for the return movement when the electric motor has been shut off, only a very slight pressure will be needed because of the fact that the carriage continues floated upon a film of air. Moreover by a suitable switching device of substantially conventional design the D.C. current to the coil 69 may be cut off and turned on as frequently as needed in order to apply repeated shock blows to the carriage, the cycling of repetition being limited only by the weight and mass of the particular test machine which is being made use of and, perhaps, limited to a degree depending upon the stroke for which the machine is designed. By mounting the permanent magnet 74 on the carriage it will be noted that it can extend to any desired degree into the coil 69 and moreover that the coil 69 can be made of any desired length so that where a long stroke may be needed a stroke of as much as six inches can be achieved in a simple compact machine of a type useful in shock testing electronic components of a convention variety. Further still the amount of aceleration needed can be controlled by the amount of current being supplied to the coil 69 and the performance of the motor otherwise carefully controlled by its electrical characteristics, the limitations in the machine being largely those of inertia stemming from the mass of the carriage itself and the load which it supports in any selected test.

The impact ring 75 may take different forms and also may vary with respect to its hardness and density in order to produce a different shock or impact effect upon the components mounted on the carriage 30. Different examples of impact rings are shown in FIGURES 6 and 7. In FIGURE 6 an impact ring 75′ is given a rounded crown 79. Shaped in this fashion there will be somewhat greater cushioning effect and an impact shock less sharp than that produced by a flat face 80 like that made use of on the impact ring 75. A sharply tapered crown 81 for an impact ring 75″ produces still greater cushioning and easing of the impact shock where circumstances such as that produced by a softer cushion are more to be desired in the test being conducted. It is, however, possible to vary the characteristics of the cushioned shocks produced by the rings of FIGURES 6 and 7 by altering the composition of the rings to harder or softer compositions depending upon the effects desired. On some occasions it may even be desirable to create a degree of rebound from the impact ring. It will be understood further that the character of the material in the impact ring will determine the duration of the shock pulse. Also the area such as the area of the flat face 80 or the effective area of the rounded impact rings of FIGURES 6 and 7 will determine the rise time.

In another form of the device illustrated in FIGURES 4 and 5 there is provided a base 85 mounted upon an appropriate support 86, the base being provided with end portions 87 and 88 leaving a space 89 therebetween. A carriage indicated generally by the reference character 90 is mounted in the space 89 between the end portions 87 and 88.

An inside wall 91 forms part of the end portion 87 and has a passage therethrough defining a substantially cylindrical stationary supporting area 92. On the carriage 90 is a hollow cylindrical sleeve 93 having a bottom 94 which may be considered as a movable impact block. A core 95 may be considered as constituting a relatively stationary impact block and is shown as a means for mounting an impact ring 96 against which the bottom 94 strikes during operation.

Surrounding the cylindrical sleeve 93 is a coil 97 of insulated electric wire and around the exterior of the coil 97 is a cylindrical wearing shoe 98 which may be considered as a movable peripheral supporting area, this being located concentrically within the stationary supporting area 92 and having a slight clearance therebetween. Within the sleeve 93 is an axial pasage 99 which surrounds an exterior wall 100 of the core 95 by a substantial clearance. A central relief passage 101 assures that there will be no air cushion to dampen and unduly modify the shock effect which is desired.

Similarly there is provided in the end portion 88 and particularly in an inside wall 104 thereof a substantially cylindrical stationary supporting area 105. A hollow cylindrical sleeve 106 has an axial passage 107 which surrounds an exterior wall 108 of a core 109 by an adequate clearance. A coil of insulated electric wire 110 is wound around the exterior of the sleeve 106 and around this is a wearing shoe 111 which provides a movable supporting area at the exterior opposite the stationary supporting area 105 and spaced therefrom by a slight clearance similar to that present at the first described end.

To effectively float the carriage 90 on a film of compressed air or gas there is provided a compressed gas line 112 which feeds gas under pressure to a conduit 113 in the base. At the left end the conduit communicates with a riser 114 which in turn connects to a manifold passage 115 shown in FIGURE 5. Radial passages 116 are fed from the manifold passage 115 and extended endwise into the clearance between the supporting areas 92 and 98.

At the other end similarly a riser 117 fed from the conduit 113 communicates with a manifold passage 118 which in turn supplies radial passages 119. These in turn feed gas under pressure to the clearance between the supporting areas 105 and 111. In a device arranged as described where there is a common source of gas under pressure for both ends of the carriage there will always be a balance imparted to the carriage. In the device as illustrated the carriage is loaded eccentrically by the locating of a vertical component block 120 with components 121 thereon nearer one end than the other. Any tendency to imbalance will be compensated for by the pressure of the gas. Where one or another of the movable support areas tends to press to a greater degree toward the surrounding stationary support area gas pressure will keep it clear and the carriage will remain level. In this form of device a platform 122 is also provided for the mounting of such components as may be desired. Wells 123 may also be made use of as containers for sundry components to be tested which because of their construction cannot readily be fastened to the carriage.

In this embodiment a lower portion 124 of appreciable mass may be suspended below the platform 122 so that even though no guides are provided in an attempt to keep the platform 122 horizontal, the distribution of weight will serve this end to the degree needed for testing purposes. Fashioned in this manner no supplemental surfaces for a steadying or positioning effect need be resorted to, the presence of which would tend to impair the free mounting of the carriage and the accurate test results which could otherwise be experienced.

An electric motor located at the left end of the device is used for driving the carriage throughout an impact motion from right to left as viewed in FIGURE 4. The motor includes some parts already described. For example, the core 95 serving as an impact block is also a permanent magnet and forms part of a magnetic yoke together with a jacket 127 of magnetic material and the inside wall 91 already described. To give this magnetic yoke desired characteristics a coil 128 of electric insulated wire may be employed energized by a suitable source.

The coil 97 previously made reference to may be considered as a stator when connected to a suitable source of direct current electrical energy through leads (not shown) but which to achieve the desired degree of freedom may extend loosely upwardly above the carriage 90. By a suitable conventional switching arrangement the D.C. energy may be applied in one direction to the coil 97 in order to drive the carriage from a right-hand position to a left-hand position of impact against the impact ring 96. To return the carriage to an initial right-hand position a light current in a reverse direction may be passed through the coil 97.

Under those circumstances where vibration testing may be desired in the same instrument the coil 110 at the opposite end of the carriage may be connected to a source of A.C. electrical energy, this coil also being construed as a stator of an electric vibrating motor. To complete the motor at this end the core 109 also constitutes part of a magnetic yoke wherein the end portion 88 and the inside wall 104 thereof are parts. This may also include an appropriate coil (not shown) similar to the coil 128 described in connection with the core at the opposite end. By providing an alternating current vibrating motor at the right end of the device of FIGURE 4 and a direct current impact generating motor at the left-hand end the device may be depended upon to serve a double purpose. The impact testing may be alternated with the vibration testing. Further still by feeding a variable current to the vibrating motor varied in accordance with a predetermined pattern the vibration characteristics imparted to the carriage 90 may be varied to suit different requirements.

From the description it will be understood that the device in either of the embodiments is one which lends itself to considerable variety of construction and design and moreover is one the pulsing of which can be varied at will so that it is capable of simulating when desired an extremely wide variety of test circumstances. The variations possible may be induced in the device without the necessity for making structural changes or of reconditioning the parts of the apparatus already present within a relatively wide latitude. The construction and design furthermore is such that the device may be built in relatively small sizes and also extremely large sizes all capable of the same high degree of testing precision for both impact and vibration.

While the invention has herein been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. An impact testing machine comprising a base, a stationary supporting area on the base, a carriage having a supporting area thereon corresponding to and movable relative to said stationary supporting area, said carriage having a reciprocating path of movement relative to said base, a stationary impact block on said base in said path of movement, a movable impact block on the carriage facing said stationary impact block and an electric motor for driving said carriage from an initial position to a position of engagement against said stationary impact block and comprising mutually movable motor elements, one of said motor elements comprising a coil of wire adapted to be connected to a source of D.C. electric energy and forming an armature, the other of said motor elements comprising a magnetic yoke forming a stator mounted in operative relationship with said coil, the motor element on the carriage being subject to movement upon energization of the coil whereby to drive said carriage along said path of movement until impact takes place and return means on said base acting against said carriage to return said carriage to said initial position, said return means comprising a gas pressure passage in the base having gas under pressure therein directed endwise against said carriage.

2. A friction free impact testing machine comprising a base, a set of longitudinally spaced peripherally extending stationary supporting areas on the base, a carriage having a set of longitudinally spaced peripherally extending supporting areas at opposite ends thereof corresponding to and movable relative to said stationary supporting areas, said carriage having a path of movement relative to said base, means forming a plurality of gas pressure passages through said base and the supporting areas thereon, said passages being directed radially inwardly against said movable supporting areas whereby to support the carriage on a film of gas, said movable supporting areas extending longitudinally a distance at least as great as the length of said path of movement, a stationary impact element on said base in the path of movement, and an electric motor for driving said carriage from an initial position at rest at one end of said path of movement into a position wherein said carriage is stopped against said stationary impact element and comprising mutually movable motor elements, one of said motor elements comprising a hollow cylindrical sleeve at each end of the carriage, a coil of wire extending around each sleeve, said wire comprising loops extending in a circumferential direction and forming an axial passage within said loops, at least one of said coils being adapted to be connected to a source of D.C. electric energy, the other of said motor elements comprising permanent magnets on the base forming a pair of stators and located respectively within the axial passages in the respective coils, one of said permanent magnets comprising the stationary impact block, a portion of said carriage at the inner end of said sleeve comprising a movable impact block and a mass of impact receiving material on one of said blocks, means forming a pressure relief passageway through each of said permanent magnets and a wearing shoe around the exterior of each of said coils having the outer surfaces thereof forming the movable supporting areas.

3. An impact testing machine comprising a base member, a stationary cylindrical supporting area on the base member, a carriage member having a cylindrical supporting area thereon corresponding to and movable relative to said stationary supporting area, a film of low friction material located between and separating said supporting areas, said carriage member having a reciprocating path of movement relative to said base and being movable about the axis of said cylindrical supporting area, a stationary impact block on said base in said path of movement, a movable impact block on the carriage member facing said stationary impact block, and a motor for driving said carriage member from an initial position to an impact position of engagement against said stationary impact block and comprising mutually movable motor elements including a coil, the motor element on the carriage member being subject to movement upon energization of the coil whereby to drive said carriage member along said path of movement to impact position.

4. An impact testing machine comprising a base member, a stationary cylindrical supporting area on the base member, a carriage member having a cylindrical supporting area thereon corresponding to and movable relative to said stationary supporting area, a film of low friction material located between and separating said supporting areas, said film comprising a fluid under pressure and passage means in one of said members under fluid pressure in communication with the film whereby to maintain said film under pressure, said carriage member having a reciprocating path of movement relative to said base member and being movable about the axis of said cylindrical supporting area, a stationary impact block on the carriage member facing said stationary impact block, and a motor for driving said carriage member from an initial position to an impact position of engagement against said stationary impact block and comprising mutually movable motor elements including a coil, the motor element on the carriage member being subject to movement upon energization of the coil whereby to drive said carriage member along said path of movement to impact position.

5. An impact testing machine comprising a base member, a stationary cylindrical supporting area on the base member, a carriage member having a cylindrical supporting area thereon corresponding to and movable relative to said stationary supporting area, a film of low friction material located between and separating said supporting areas, said carriage member having a reciprocating path of movement relative to said base member and being movable about the axis of said cylindrical supporting area, said carriage member having a greater mass located below the axial center line of said cylindrical supporting areas whereby to continuously maintain said carriage member in substantially the same rotational attitude, a motor for driving said carriage member from an initial position to an impact position and comprising mutually movable motor elements including a coil, the motor element on the carriage member being subject to movement upon energization of the coil whereby to drive said carriage member along said path of movement to impact position.

6. An impact testing machine comprising a base member, a set of longitudinally spaced stationary cylindrical supporting areas on the base, a carriage member having a set of longitudinally spaced cylindrical supporting areas at opposite ends thereof corresponding to said stationary supporting areas, said carriage member having a path of movement relative to said base member and being adapted for attitude displacement about the axis of said path, a low friction medium located between and in low friction relationship respectively with the respective supporting areas on the base member and the carriage member, a stationary impact element on the base member in a position opposing movement of said carriage member, and an electric motor for driving said carriage member from an initial position to an impact position and comprising mutually movable motor elements respectively on the base and the carriage, one of said motor elements comprising a substantially cylindrical coil of wire located within each of the stationary cylindrical supporting areas and adapted to be connected to a source of D.C. electric energy, the other of said motor elements comprising a permanent magnet forming a stator and having a portion thereof located within the respective coil.

7. An impact testing machine comprising a base member, a set of longitudinally spaced stationary cylindrical supporting areas on the base, a carriage member having a set of longitudinally spaced cylindrical supporting areas at opposite ends thereof corresponding to said stationary supporting areas, said carriage member having a path of movement relative to said base member and being movable about the axis of said path, fluid pressure passage means in one of the sets of supporting areas, said passage means being directed against the other of the sets of supporting areas whereby to support the carriage member on a film of fluid, a stationary impact element on the base member in a position opposing movement of said carriage member, and an electric motor for driving said carriage member from an initial position to an impact position and comprising mutually movable motor elements respectively on the base and the carriage, one of said motor elements comprising a substantially cylindrical coil of wire located within each of the stationary cylindrical supporting areas and adapted to be connected to a source of D.C. electric energy, the other of said motor elements comprising a permanent magnet forming a stator and having a portion thereof located within the respective coil.

References Cited in the file of this patent
UNITED STATES PATENTS

| | | |
|---|---|---|
| 2,809,514 | Corcoran | Oct. 15, 1957 |
| 2,862,385 | Woods | Dec. 2, 1958 |
| 3,062,036 | York | Nov. 6, 1962 |
| 3,074,269 | Wohl | Jan. 22, 1963 |